United States Patent
Deshpande

(10) Patent No.: US 10,210,500 B2
(45) Date of Patent: Feb. 19, 2019

(54) ULTRASONIC TRIANGULATION FOR PAYMENTS METHOD AND APPARATUS

(71) Applicant: MasterCard International Incorporated, Purchase, NY (US)

(72) Inventor: Rahul Deshpande, Chesterfield, MO (US)

(73) Assignee: Mastercard International Incorporated, Purchase, NY (US)

( * ) Notice: Subject to any disclaimer, the term of this patent is extended or adjusted under 35 U.S.C. 154(b) by 650 days.

(21) Appl. No.: 14/493,920

(22) Filed: Sep. 23, 2014

(65) Prior Publication Data

US 2016/0086156 A1    Mar. 24, 2016

(51) Int. Cl.
| | | |
|---|---|---|
| G06Q 30/04 | (2012.01) | |
| G06Q 20/32 | (2012.01) | |
| G06Q 20/14 | (2012.01) | |
| G01S 1/72 | (2006.01) | |
| H04W 4/021 | (2018.01) | |

(52) U.S. Cl.
CPC .......... *G06Q 20/3224* (2013.01); *G01S 1/725* (2013.01); *G06Q 20/14* (2013.01); *G06Q 20/3272* (2013.01); *H04W 4/021* (2013.01)

(58) Field of Classification Search
CPC ..... G06Q 30/04; G06Q 20/322; H04W 4/005; H04W 4/029; A61B 2034/2063; G01S 1/725
See application file for complete search history.

(56) References Cited

U.S. PATENT DOCUMENTS

| | | | | |
|---|---|---|---|---|
| 2008/0154734 | A1* | 6/2008 | Fernandez | G06Q 20/10 705/16 |
| 2010/0180009 | A1* | 7/2010 | Callahan | G06Q 30/02 709/217 |
| 2011/0137773 | A1* | 6/2011 | Davis, III | G06Q 30/04 705/34 |
| 2013/0225204 | A1* | 8/2013 | Mathews | H04N 21/4126 455/456.3 |
| 2013/0254104 | A1* | 9/2013 | Fernandez | G06Q 30/04 705/40 |
| 2013/0279297 | A1* | 10/2013 | Wulff | G01S 15/00 367/127 |
| 2014/0337234 | A1* | 11/2014 | Tang | H04L 9/3265 705/71 |
| 2015/0134540 | A1* | 5/2015 | Law | G06Q 20/351 705/72 |

FOREIGN PATENT DOCUMENTS

CN    102256005 A    * 11/2011    ............ H04M 1/725

OTHER PUBLICATIONS

High Accuracy 3D Indoor Positioning Using Broadband Ultrasonic Signals; Sergio I. Lopes et al.; 2012; 8 pages.*
Acoustic Localization by Interaural Level Difference by Stanley T. Birchfiled et al.; Mar. 2005; 4 pages.*

(Continued)

Primary Examiner — Eric T Wong
Assistant Examiner — Mary M Gregg
(74) Attorney, Agent, or Firm — Hovey Williams LLP

(57) ABSTRACT

A system, method, and computer-readable storage medium to determine a table location of a payment cardholder within a restaurant, to enable automatic bill receipt for the table.

20 Claims, 6 Drawing Sheets

(56) References Cited

OTHER PUBLICATIONS

Indoor Pseudo-ranging of Mobile Devices using Ultrasonic Chirps by Lazik et al; 2012; 14 pages.*
Positioning with Independent Ultrasonic Beacons by McCarthy et al.; 11 pages; 2006; Department of Compter Science, University of Bristol, UK.*
Is Android using NTP to sync time? by stackoverflow.com; 3 pages; asked/started Jan. 17, 2013 (Year: 2013).*
Automatic Time Synchronization on Windows Mobile devices by 42Gears; 3 pages; Dec. 16, 2011 (Year: 2011).*
Apple iOS must synchronize the internal clock at least once every 24 hours with an authoritative time server or the Global Positioning System by stigviewer.com; 1 page; Jan. 30, 2014; www.stigviewer.com/stig/apple_ios_7/2014-01-30/finding/V-43228 (Year: 2014).*

* cited by examiner

ULTRASONIC TRIANGULATION FOR PAYMENTS METHOD AND APPARATUS

BACKGROUND

Field of the Disclosure

Aspects of the disclosure relate in general to financial services. Aspects include an apparatus, system, method and computer-readable storage medium to determine a table location of a payment cardholder within a restaurant, to enable automatic bill receipt for the table.

Description of the Related Art

The use of payment cards, such as credit or debit cards, is ubiquitous in commerce. Typically, a payment card is electronically linked via a payment network to an account or accounts belonging to a cardholder. These accounts are generally deposit accounts, loan or credit accounts at an issuer financial institution. During a purchase transaction, the cardholder can present the payment card in lieu of cash or other forms of payment.

Many restaurants accept payment cards. Typically, restaurant customers sit at tables and are served by a waiter, who brings the food when it is ready. After eating, the customers can request an itemized bill to be presented by the waiter, and can then present a payment card to pay the bill.

SUMMARY

Embodiments include a system, apparatus, device, method and computer-readable medium configured to locate a payment cardholder within a restaurant, to enable automatic bill receipt.

In a billing server method embodiment, the billing server receives a request for a time sync via a network interface. The request contains a unique identifier from a mobile device. The network interface transmits the time sync to the mobile device. The network interface receives a plurality of messages from a plurality of ultrasonic sensors, each of the plurality of messages containing the unique identifier and a time when an ultrasound pulse is received. The network interface receives a time at which the ultrasound pulse was broadcast from the mobile device. A processor determines a fixed location nearest to the mobile device based on the plurality of messages containing the unique identifier and the time when an ultrasound pulse is received, and the time when the ultrasound pulse was broadcast. The network interface transmits an invoice associated with the fixed location nearest to the mobile device.

In a mobile device method embodiment, an antenna transmits a request for a time sync to a billing server via a antenna, the request containing a unique identifier. The antenna receives the time sync from the billing server. A speaker broadcasts an ultrasonic pulse, the ultrasonic pulse containing the unique identifier. The antenna transmits to the billing server a time at which the ultrasonic pulse was broadcast via the speaker. The antenna receives from the billing server an invoice associated with a fixed location nearest to the mobile device. A display presents the invoice associated with the fixed location.

DETAILED DESCRIPTION

One aspect of the disclosure includes the understanding that cardholders that waiting for the bill is an annoying part of the restaurant experience Another aspect of the disclosure is the realization that cardholders tend to travel with mobile devices in close proximity. Such mobile devices include mobile telephones, tablet computers, laptop or notebook computers, personal digital assistants (PDAs), or any other mobile device known in the art. Typically, the mobile device and the payment card are kept on the person (e.g., in a pocket), or nearby in a purse, briefcase, backpack or other portable storage container. For the purposes of this disclosure, a payment card includes, but is not limited to: credit cards, debit cards, prepaid cards, electronic checking, stored-value cards, or other physical payment devices. Payment card embodiments in this disclosure are wireless-enabled.

Another aspect of the disclosure includes the realization that rapidly increasing use of mobile devices offers the ability to wirelessly track the position (or table) of a cardholder in a restaurant, which enables bill presentation of a cardholder within the restaurant.

Embodiments of the present disclosure include a system, apparatus, method, and computer-readable storage medium configured to determine a table location of a payment cardholder within a restaurant, to enable automatic bill receipt for the table. While embodiments are described in a restaurant setting involving table position, it is understood that other embodiments may extend to other variations, including automated merchant kiosks in a retail setting.

Figure 1A:
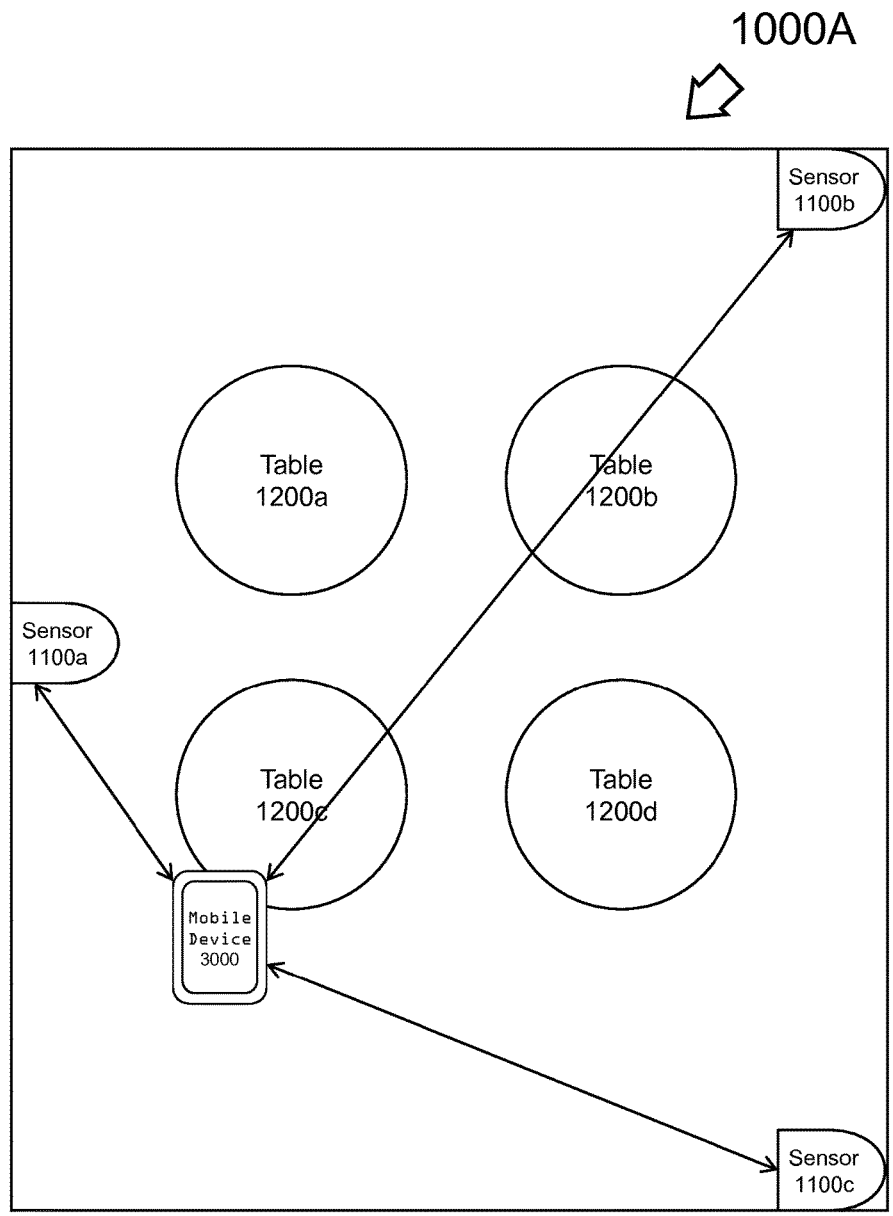
FIGS. 1A and 1B illustrate embodiments of a system configured to determine a table location of a payment cardholder within a restaurant, to enable automatic bill receipt for the table.
Figure 1B:
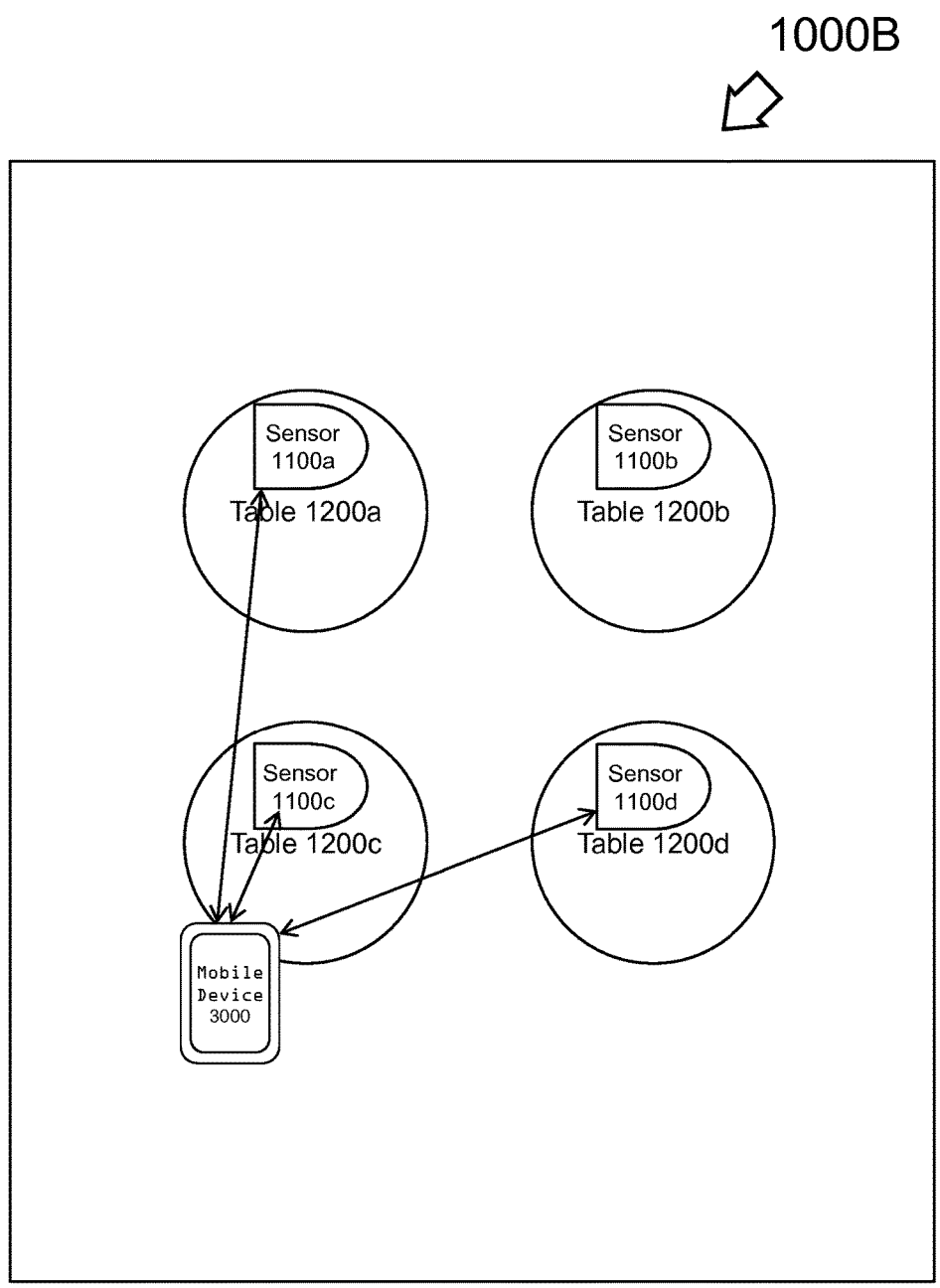

Embodiments will now be disclosed with reference to a block diagram of exemplary restaurant systems 1000A-B of FIGS. 1A and 1B configured to determine a table location of a payment cardholder within a restaurant, to enable automatic bill receipt for the table, constructed and operative in accordance with an embodiment of the present disclosure.

As shown in FIGS. 1A and 1B, a restaurant may have a plurality of tables 1200 and ultrasonic sensors 1100. It is understood by those familiar in the art that any number of tables or sensors may be used. For illustrative purposes only, in FIGS. 1A and 1B there are four tables 1200a-d. In system 1000A of FIG. 1A, the plurality of ultrasonic sensors 1100a-c are placed different areas around the room to form at least one triangle. If more ultrasonic sensors are available, they may be placed evenly about the room. In an alternate embodiment, such as system 1000B of FIG. 1B, ultrasonic sensors 1100a-d may be placed respectively at each table 1200a-d.

System 1000A-B further includes a cardholder using a mobile device 3000. Mobile device 3000 communicates with ultrasonic sensors 1100 to determine the closest table 1200, which is assumed to be the table at which the cardholder is sitting. Details of mobile device 3000 are described in greater depth with FIG. 3 below.

Figure 2:
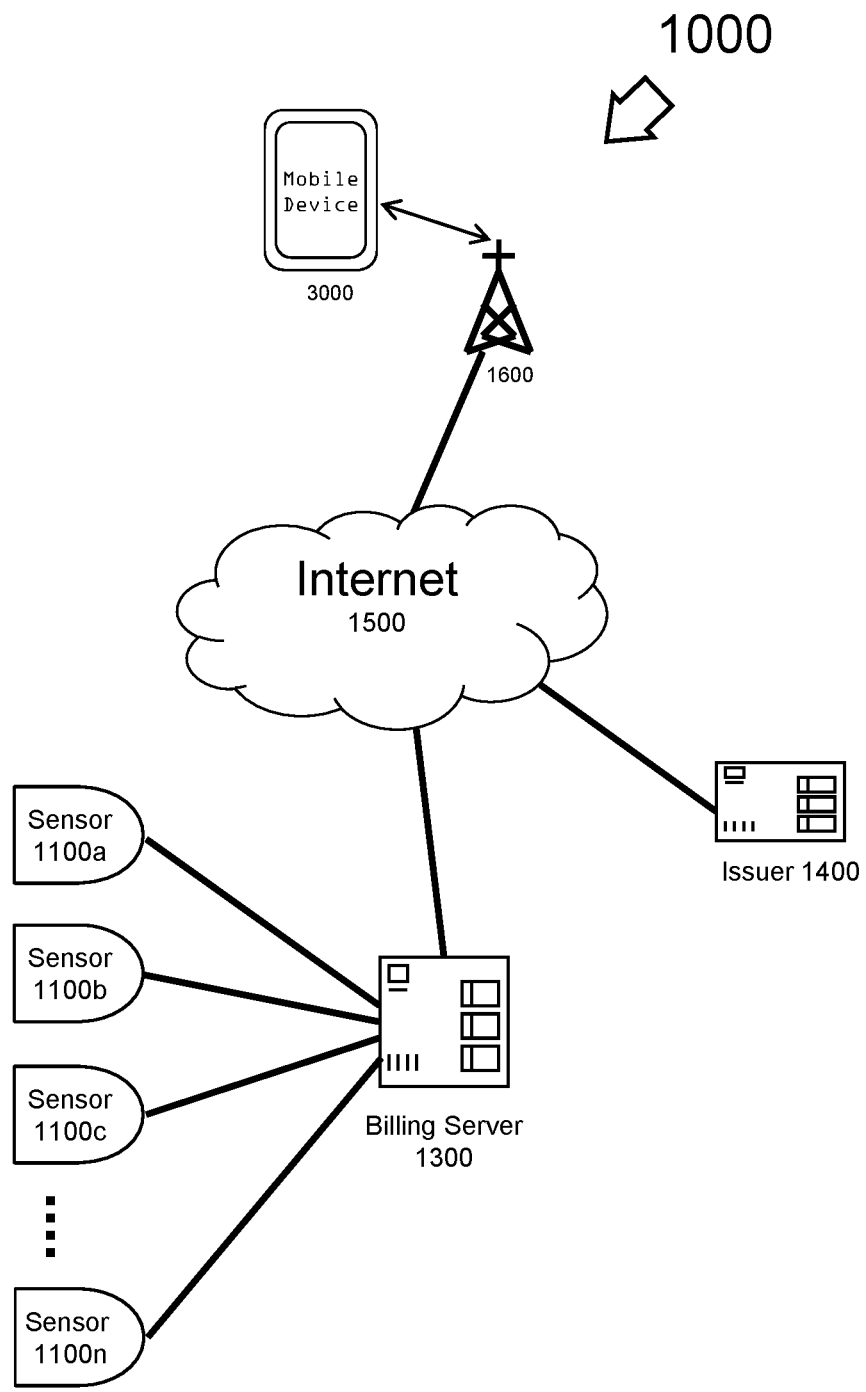
FIG. 2 depicts a system configured to determine a table location of a payment cardholder within a restaurant, to enable automatic bill receipt for the table.

FIG. 2 is a block diagram elaborating the backend of system 1000 configured to determine a table location of a payment cardholder within a restaurant, to enable automatic bill receipt for the table, constructed and operative in accordance with an embodiment of the present disclosure.

Mobile device 3000 communicates ultrasonically with ultrasonic sensors 1100a-n to triangulate and determine which table 1200 the payment cardholder is sitting at. Sensors 1100a-n are coupled electronically to billing server 1300. It is understood that sensors 1100a-n may be physically coupled or may communicate wirelessly with the billing server 1300. Once the table position is determined, billing server 1300 may provide an invoice to the mobile device 3000, allowing for payment via the mobile device 3000.

In such a system, mobile devices 2000 may include a mobile phone, tablet computer, personal digital assistant (PDA) or other portable computing device known in the art capable of wirelessly tracking payment cards 2000, and reporting the payment card location to a billing server 1300.

Billing server 1300 may communicate with the mobile device 3000 via a wide area network (WAN) such as the internet 1500 and a mobile telephony network 1600. Payments may be enabled via physical or virtual payment cards issued by an issuer 1400. An issuer 1400 is the financial institution that issues a payment card. For the purposes of this disclosure, a payment card includes, but is not limited to: credit cards, debit cards, prepaid cards, electronic checking, electronic wallet, mobile device or other electronic payments.

The billing server 1300 may exist at the merchant, vendor, restaurant, payment network, or other entity. An example payment network includes MasterCard International Incorporated of Purchase, N.Y.

Figure 3:
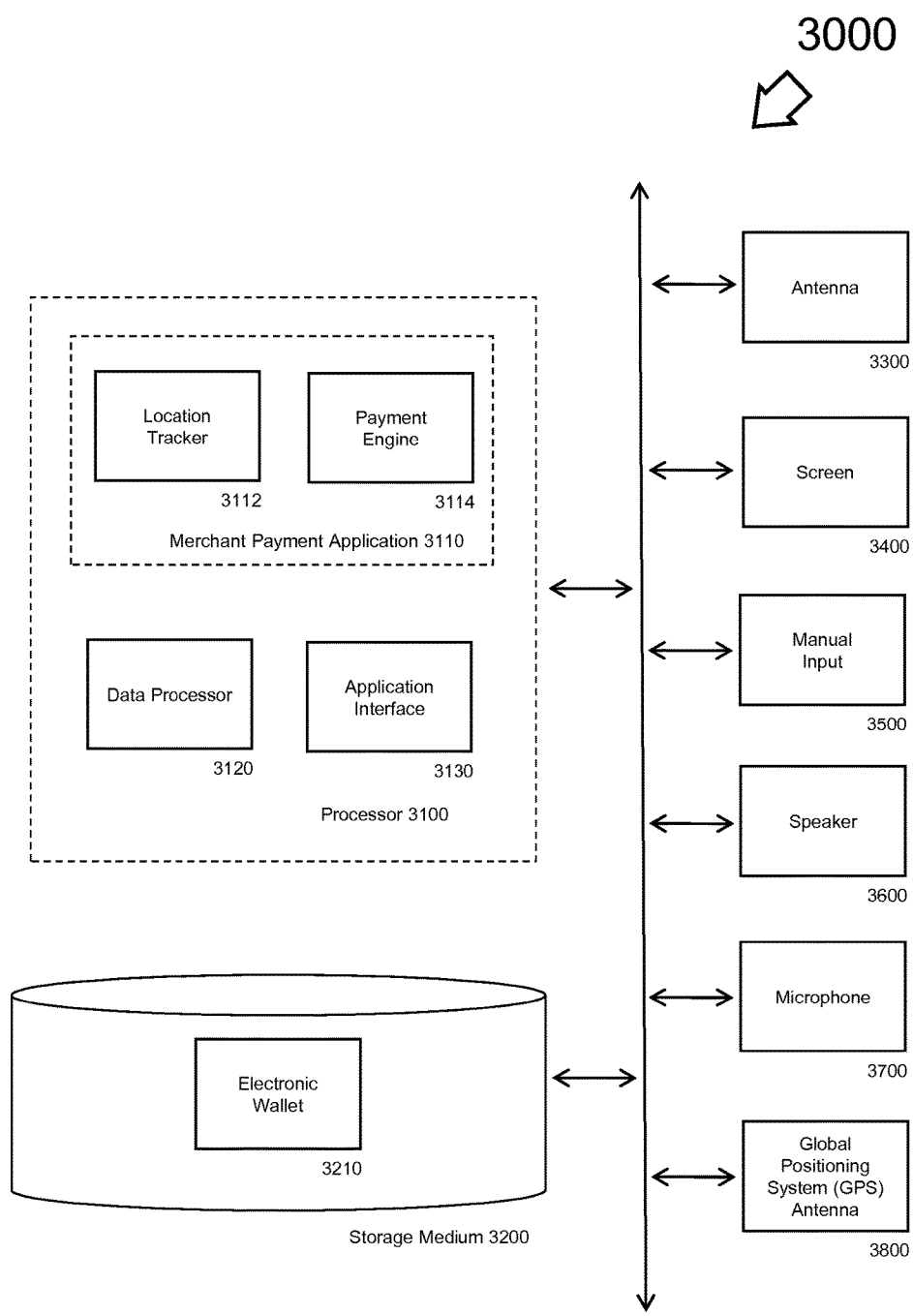
FIG. 3 is a block diagram of a mobile device in a system configured to determine a table location of a payment cardholder within a restaurant, to enable automatic bill receipt for the table.

Embodiments will now be disclosed with reference to a block diagram of a mobile device 3000 of FIG. 3 designed to be used in a system 1000, constructed and operative in accordance with an embodiment of the present disclosure. When used in conjunction with a billing server 1300 and a payment card, mobile device 3000 may be used to assist in determining a table location of a payment cardholder within a restaurant, to enable automatic bill receipt for the table. Embodiments may further enable payment of the bill received with a physical or virtual payment card. In this example, mobile device 3000 is a mobile phone. As mentioned above, it is understood by those familiar with the art that mobile device 3000 may be a mobile phone, tablet computer, personal digital assistant (PDA) or other portable computing device known in the art capable of ultrasonic triangulation, and communicating with a billing server 1300.

Mobile device 3000 may run a real-time multi-tasking operating system (OS) and include at least one processor or central processing unit (CPU) 3100, a non-transitory computer-readable storage medium 3200, and an antenna 3300. An example operating system may include the Apple iOS, Google Android Operating System, Blackberry OS, FireFox mobile operating system, Microsoft Windows 8, and the like. Mobile device 3000 may further include a screen or display device 3400, manual input 3500, speaker 3600, and microphone 3700 and Global Positioning System (GPS) antenna 3800.

Processor 3100 may be any central processing unit, microprocessor, micro-controller, computational device or circuit known in the art. It is understood that processor 3100 may temporarily store instructions and data in Random Access Memory (not shown).

As shown in FIG. 3, processor 3100 is functionally comprised of a merchant payment application 3110, a data processor 3120, and application interface 3130.

Merchant payment application 3110 enables the functionality for the consumer to ultrasonically locate a table location of the mobile device 3000 in a restaurant and to make a payment to the restaurant. Merchant payment application 3110 may further comprise: location tracker 3112, and payment engine 3114.

A location tracker 3112 is a program or service that wirelessly tracks the presence of payment card 2000. A location tracker 3112 uses ultrasound to wirelessly determine the location of mobile phone 3000 within a merchant, such as a restaurant. In other embodiments, location tracker 3112 may use alternative wireless technology for this location determination, and may do so via NFC, RFID, Bluetooth, WiFi or other wireless standard known in the art.

Payment engine 3114 enables the receipt and payment of merchant bills via the merchant server 1300. Further details and uses of payment engine 3114 are described further herein.

Data processor 3120 enables processor 3100 to interface with storage media 3200, antenna 3300, screen 3400, manual input 3500, speaker 3600, microphone 3700, GPS antenna 3800, computer memory or any other component not on the processor 3100. The data processor 3120 enables processor 3100 to locate data on, read data from, and write data to these components.

Application interface 3130 may be any graphical user interface known in the art to facilitate communication with the user of the mobile device 3000; as such, application interface 3130 may communicate with the user via screen 3400, manual input 3500, speaker 3600, or microphone 3700.

These structures may be implemented as hardware, firmware, or software encoded on a computer readable medium, such as storage media 3200. Further details of these components are described with their relation to method embodiments below.

Antenna 3300 may be any data port as is known in the art for interfacing, communicating or transferring data across a telecommunications network, computer network, Bluetooth, WiFi, near-field communications, contactless point-of-sale network, and the like. Examples of such a network include a digital cellular telephony network. Antenna 3300 allows mobile device 3000 to communicate via the digital cellular telephony network to Billing server 1300, or other entities. Furthermore, antenna 3300 allows mobile device 3000 to detect and communicate with payment card 2000.

Screen 3400 may be any liquid crystal display (LCD) display, light emitting diode (LED) screen, touch-sensitive screen, or other monitor known in the art for visually displaying images and text to a user.

Manual input 3500 may be buttons, a conventional keyboard, keypad, track pad, trackball, or other input device as is known in the art for the manual input of data. In some embodiments, manual input 3500 may be integrated into a touch-sensitive screen 3400. In other embodiments, manual input 3500 may be a virtual keyboard.

In addition, a speaker 3600 may be attached for reproducing audio signals from processor 3100. Speaker 3600 may also be able to generate ultrasonic signals for detection by sensors 1100. Microphone 3700 may be any suitable microphone as is known in the art for providing audio signals to processor 3100. Microphone 3700 is also configured to receive ultrasonic signals from sensors 1100.

GPS antenna 3800 is satellite-based navigation antenna that allows mobile device 3000 to ascertain its location by triangulating with satellites as one skilled in the art can appreciate.

It is understood that microphone 3700, speaker 3600, and GPS antenna 3800 may include appropriate digital-to-analog and analog-to-digital conversion circuitry as appropriate.

Storage medium 3200 may be a conventional read/write memory, such as a flash memory, memory stick, transistor-based memory, or other computer-readable memory device as is known in the art for storing and retrieving data.

In addition, as shown in FIG. 3, storage medium 3200 may also contain an electronic wallet 3210. When present, electronic wallet 3210 is a data structure or database that contains electronic payment information, which may include, but is not limited to: a payment card information (such as primary account number (PAN), expiration dates and cardholder name), and electronic checking account numbers.

Figure 5:
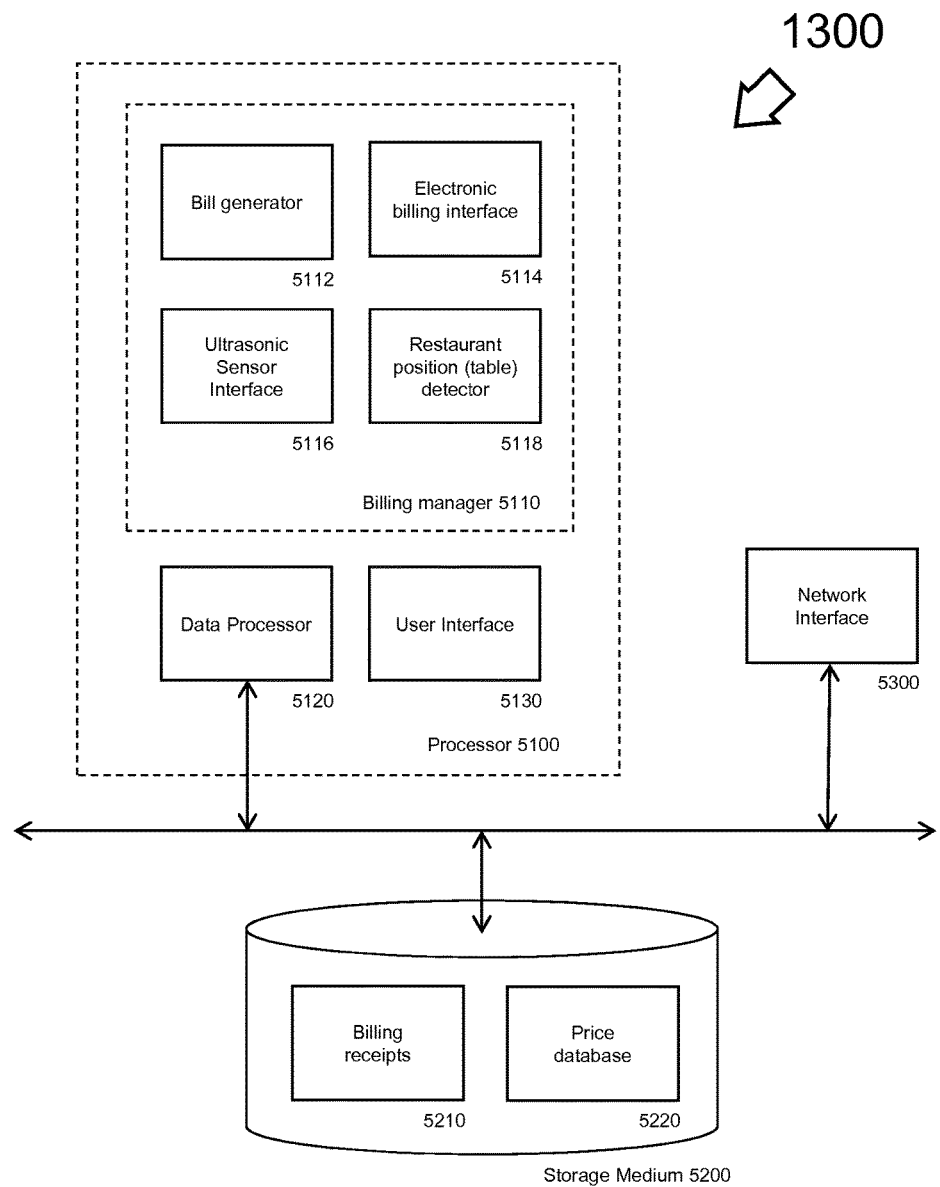
FIG. 5 is a block diagram of a billing server in a system configured to determine a table location of a payment cardholder within a restaurant, to enable automatic bill receipt for the table.

Embodiments will now be disclosed with reference to a block diagram of an exemplary billing server 1300 of FIG. 5 configured to track the location of lost payment cards, constructed and operative in accordance with an embodiment of the present disclosure.

Billing server 1300 may run a multi-tasking operating system (OS) and include at least one processor or central processing unit (CPU) 5100, a non-transitory computer-readable storage medium 5200, and a network interface 5300. An example operating system may include Advanced Interactive Executive (AIX™) operating system, UNIX operating system, or LINUX operating system, and the like.

Processor 5100 may be any central processing unit, microprocessor, micro-controller, computational device or circuit known in the art. It is understood that processor 5100 may communicate with and temporarily store information in Random Access Memory (RAM) (not shown).

As shown in FIG. 5, processor 5100 is functionally comprised of a billing manager 5110, a data processor 5120, and user interface 5130.

Billing manager 5110 is a component configured to perform risk estimation by analyzing financial transactions. Billing manager 5110 may further comprise: a bill generator 5112, electronic billing interface 5114, ultrasonic sensor interface 5116, and restaurant position (table) detector 5118.

Bill generator 5112 is the component of billing manager 5110 that generates an itemized bill based on items ordered or purchased by a customer. Bill generator 5112 may access a price database 5220 for pricing information.

Electronic billing interface 5114 is the structure or component capable of processing electronic billing, including electronic presentation of bills generated by bill generator 5112, and electronic payments received (via a network interface 5300) from a mobile device 3000. Electronic billing interface 5114 may store billing receipts 5210 in a database.

Ultrasonic sensor interface 5116 is the interface that allows billing manager 5110 to communicate with ultrasonic sensors 1100.

Communicating with ultrasonic sensor interface 5116, restaurant position (table) detector 5118 is the structure that triangulates and determines the table position of the mobile device 3000.

Data processor 5120 enables processor 5100 to interface with storage medium 5200, network interface 5300 or any other component not on the processor 5100. The data processor 5120 enables processor 5100 to locate data on, read data from, and write data to these components.

User interface 5100 is any structure that allows shopkeepers, wait staff, and merchant employees to enter orders and access bill manager 5110.

These structures may be implemented as hardware, firmware, or software encoded on a computer readable medium, such as storage medium 5200. Further details of these components are described with their relation to method embodiments below.

Network interface 5300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 5300 allows billing server 1300 to communicate with cardholders using mobile devices 3000 or other entities via the Internet 1500.

Computer-readable storage medium 5200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. Significantly, computer-readable storage medium 5200 may be remotely located from processor 5100, and be connected to processor 5100 via a network such as a local area network (LAN), a wide area network (WAN), or the Internet.

In addition, as shown in FIG. 5, storage medium 5200 may also contain billing receipts 5210, and a price database 5220. Billing receipts 5210 is configured to store records of billing transactions created by bill generator 5112 and paid via electronic billing interface 5114. Price database 5220 is a data structure configured to store records of prices for goods and services at a merchant; for example, in a restaurant setting price database 5220 contains the prices for food available for order at the restaurant.

It is understood by those familiar with the art that one or more of these databases 5210-5220 may be combined in a myriad of combinations. The function of these structures may best be understood with respect to the message diagram of FIG. 4, as described below.

Figure 4:
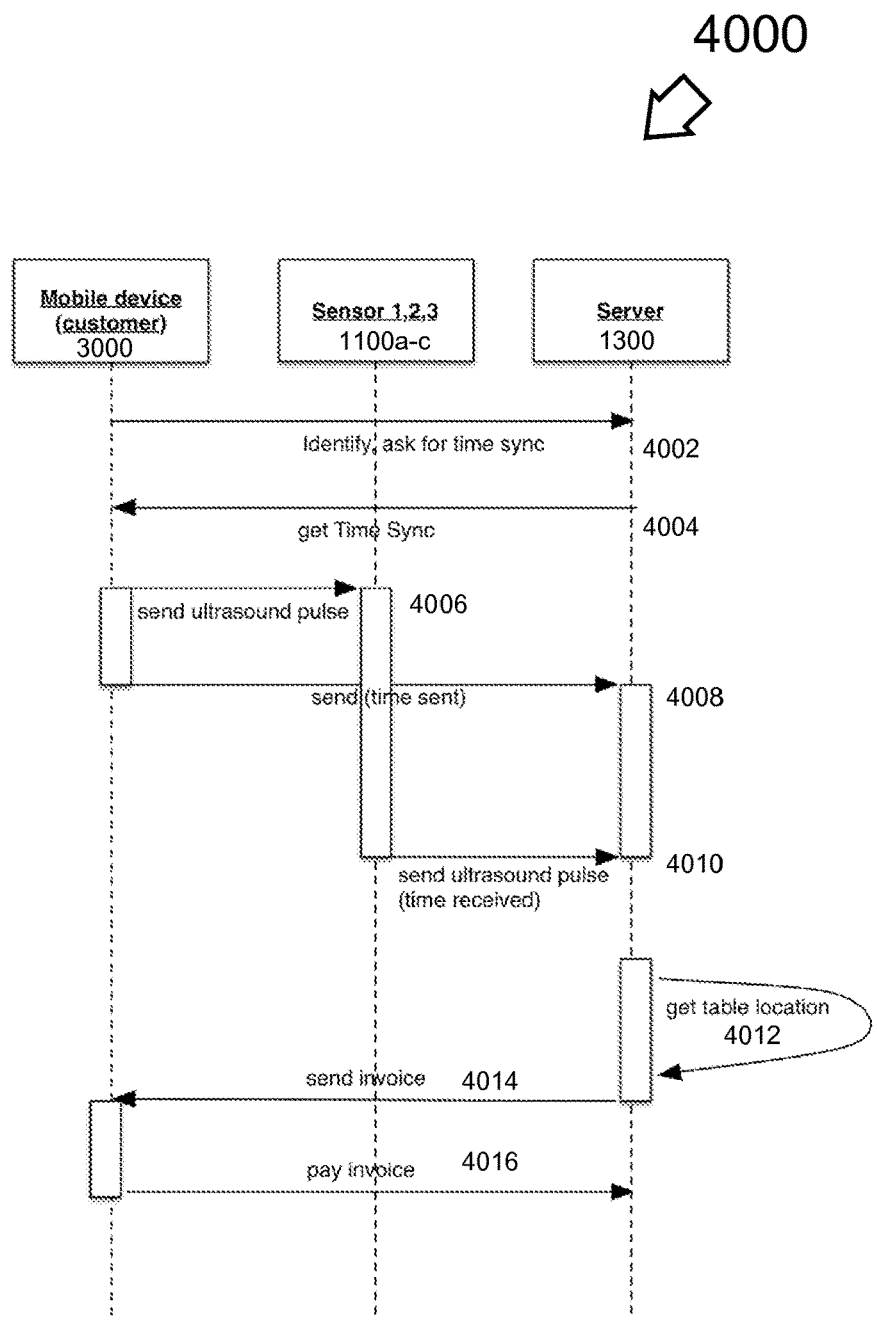
FIG. 4 illustrates a message diagram of a method to determine a table location of a payment cardholder within a restaurant, to enable automatic bill receipt for the table.

We now turn our attention to the method or process embodiments of the present disclosure described in the message diagram of FIG. 4. It is understood by those known in the art that instructions for such method embodiments may be stored on their respective computer-readable memory and executed by their respective processors. It is understood by those skilled in the art that other equivalent implementations can exist without departing from the spirit or claims of the disclosure.

FIG. 4 illustrates a message diagram of a method 4000 to determine a table location of a payment cardholder within a restaurant, to enable automatic bill receipt for the table, constructed and operative in accordance with an embodiment of the present disclosure.

As shown in FIG. 4, in process 400 a mobile device 3000 communicates with ultrasonic sensors 1100*a-c* and a billing server 1300. A restaurant may have a plurality of tables 1200 and ultrasonic sensors 1100. It is understood by those familiar in the art that a restaurant may have any number of tables 1200, and that ultrasonic sensors 1100 may be placed at tables or about common areas of the restaurant. The plurality of ultrasonic sensors 1100a-c are placed different areas around the room to form at least one triangle. If more ultrasonic sensors are available, they may be placed evenly about the room.

A customer's mobile device 3000 communicates with the server and sensors 1100 to determine the customer's table location. This allows the customer's invoice ("bill") to be sent by the billing server 1300 to the mobile device 3000. The customer may then pay the invoice electronically using the mobile device 3000.

Initially, the customer launches a merchant payment application 3110 on the mobile device 3000. In some instances, merchant payment application 3110 may be branded by the restaurant or merchant. Location tracker 3112 transmits a message to the billing server 1300, identifying the customer's mobile device 3000 and requesting a time sync, message 4002. Location tracker 3112 may transmit a unique identifier to identify the mobile device 3000. Example identifiers include, but are not limited to: telephone number, SIM card number, or media access control (MAC) address.

It is understood that the mobile device 3000 communicates with the billing server 1300 via a combination of a wireless telephony network 1600 and a wide area network such as the Internet 1500.

In turn, server restaurant position (table) detector 5118 receives the unique identifier and the time sync request, and then transmits a time sync back to the mobile device 3000, message 4004. Network Time Protocol (NTP) may be used to synchronize the clocks.

Once the time sync is received, the mobile device 3000 is synchronized with the local time at the merchant/restaurant location. Mobile device speaker 3600 sends (broadcasts) a loud ultrasonic pulse, message 4006, and sends server restaurant position (table) detector 5118 the time at which the ultrasonic pulse was transmitted, message 4008. The transmitted ultrasonic pulse may be encoded with the unique identifier, to identify the mobile device 3000. As the probability of having another device contacting the server at exact same time is miniscule, it is understood that in some embodiments the ultrasonic pulse need not be related to the unique identifier. The identification happens at the time sync with the server. In embodiments where a unique identifier is not used, if two devices ask for the invoice at exact same time, then both devices will be asked to retry again.

The techniques used for sending an identifier may include Amplitude Shift Keying (ASK), Frequency Shift Keying (FSK), and Phase Shift Keying (PSK).

Each ultrasonic sensors 1100a-c that receives the ultrasonic pulse informs ultrasonic sensor interface 5116 of the time at which the ultrasonic pulse was received, message 4010. Restaurant position (table) detector 5118 receives the receipt times from ultrasonic sensor interface 5116.

Using the time the ultrasonic signals are received by the ultrasonic sensors 1100a-c, restaurant position (table) detector 5118 triangulates and determines the nearest table location to the mobile device 3000, block 4012.

Billing generator 5112 is able to generate the customer's invoice for the table based on items ordered from the price database 5220, appropriate fees and taxes. The generated itemized invoice is forwarded to the electronic billing interface 5114, which then transmits the resulting invoice to mobile device 3000, block 4014.

The mobile device payment engine 3114 receives the generated itemized invoice and is able to present the generated itemized invoice to the customer via the mobile device screen 3400. The customer is then able to approve the invoice and pay the invoice using a payment card or electronic wallet 3210, message 4016.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A method for determining a location of a mobile device using a device locating system, the method comprising:
   receiving, by a position detector of a server via a network interface, a first message from the mobile device, the first message containing a unique identifier identifying the mobile device and a request to synchronize a clock of the device locating system with a clock of the mobile device;
   in response to receiving the first message, transmitting, by the position detector via the network interface, a time sync message to the mobile device to synchronize the clock of the device locating system with a clock of the mobile device;
   receiving, by a plurality of ultrasonic sensors, an ultrasonic pulse selectively broadcast by the mobile device, wherein the plurality of ultrasonic sensors transmit a plurality of sensor messages to an ultrasonic sensor interface component of the server without communicating with the mobile device;
   receiving, by the position detector via the network interface, a second message from the mobile device, the second message containing the unique identifier and a time at which the ultrasonic pulse was broadcast by the mobile device;
   receiving, by the ultrasonic sensor interface component, the plurality of sensor messages from the plurality of ultrasonic sensors, each sensor message of the plurality of sensor messages received from a respective ultrasonic sensor and containing the unique identifier and a time when the ultrasonic pulse was received by the respective ultrasonic sensor; and
   determining, by the position detector, a fixed location nearest to the mobile device based on the plurality of sensor messages containing the unique identifier and the time when the ultrasonic pulse was received, and the second message containing the time when the ultrasonic pulse was broadcast.

2. The method of claim 1, further comprising:
   transmitting to the mobile device, by an electronic billing component, an invoice associated with the fixed location nearest to the mobile device.

3. The method of claim 2, further comprising:
   generating, with a bill generator of the server, the invoice associated with the location nearest to the mobile device.

4. The method of claim 3, further comprising:
   receiving, from the mobile device, an electronic payment of the invoice via the network interface, the electronic payment being payment card information or electronic checking account information.

5. The method of claim 4, wherein the fixed location is a merchant kiosk.

6. The method of claim 4, wherein the fixed location is a restaurant table.

7. The method of claim 4, wherein the payment card information includes a primary account number (PAN) and payment card expiration date.

8. A server comprising:
- a hardware processor in communication with a network interface, wherein the network interface is configured to communicate with a mobile device and a plurality of ultrasonic sensors, the mobile device configured to selectively broadcast an ultrasonic pulse having a unique identifier of the mobile device encoded therein: and
- the hardware processor executing a billing manager coupled in communication to the network interface, the billing manager comprising:
- an ultrasonic sensor interface component configured to receive a plurality of sensor messages from the plurality of ultrasonic sensors, each ultrasonic sensor of the plurality of ultrasonic sensors receiving the ultrasonic pulse, wherein each ultrasonic sensor transmits a respective sensor message to the ultrasonic sensor interface component without communicating with the mobile device, each sensor message of the plurality of sensor messages containing the unique identifier and a time when the ultrasonic pulse was received; and
- a position detector configured to:
  - receive a first message from the mobile device, the first message containing the unique identifier of the mobile device and a request to synchronize a clock of the billing server with a clock of the mobile device;
  - in response to receiving the first message, transmit a time sync message to the mobile device to synchronize the clock of the billing server with the clock of the mobile device;
  - receive from the mobile device a second message containing a time at which the ultrasonic pulse was broadcast by the mobile device;
  - receive from the ultrasonic sensor interface the plurality of sensor messages; and
  - determine a fixed location nearest to the mobile device based on the plurality of sensor messages containing the unique identifier and the time when the ultrasonic pulse was received and the second message containing the time at which the ultrasonic pulse was broadcast.

9. The server of claim 8, wherein the billing manager further comprises an electronic billing component configured to transmit to the mobile device an invoice associated with the fixed location nearest to the mobile device.

10. The billing server of claim 9, wherein the billing manager further comprises a bill generator configured to generate the invoice associated with the location nearest to the mobile device.

11. The billing server of claim 10, wherein the network interface is further configured to receive an electronic payment of the invoice, the electronic payment being payment card information or electronic checking account information.

12. The server method of claim 11, wherein the fixed location is a merchant kiosk.

13. The server of claim 11, wherein the fixed location is a restaurant table.

14. The server of claim 11, wherein the payment card information includes a primary account number (PAN) and payment card expiration date.

15. A method for determining a location of a mobile device using a device locating system, the method comprising:
- transmitting a first message from the mobile device to a position detector of a server via an antenna of the mobile device, the first message containing a unique identifier for the mobile device and a request to synchronize a clock of the mobile device with a clock of the device locating system;
- receiving a time sync message from the position detector via the antenna, the time sync message configured to synchronize a clock of the billing server with a clock of the mobile device;
- broadcasting, by the mobile device, an ultrasonic pulse via a speaker for detection by a plurality of ultrasonic sensors, wherein the plurality of ultrasonic sensors transmit a plurality of sensor messages to the server without communicating with the mobile device, the ultrasonic pulse containing the unique identifier of the mobile device encoded therein: and
- transmitting from the mobile device to the position detector, via the antenna, a second message containing a time at which the ultrasonic pulse was broadcast via the speaker for determining:
- a fixed location nearest to the mobile device, the fixed location nearest to the mobile device based on the plurality of sensor messages containing the unique identifier and a time when the ultrasonic pulse was received by each respective ultrasonic sensor of the plurality of ultrasonic sensors, and the time at which the ultrasonic pulse was broadcast by the mobile device.

16. The method of claim 15, further comprising:
- receiving from an electronic billing component, via the antenna, an invoice associated with the fixed location nearest to the mobile device; and
- presenting, on a display, the invoice associated with the fixed location.

17. The method of claim 16, further comprising:
- transmitting an electronic payment of the invoice via the antenna, the electronic payment being payment card information or electronic checking account information.

18. The device method of claim 17, wherein the payment card information includes a primary account number (PAN) and payment card expiration date.

19. The method of claim 18, wherein the fixed location is a merchant kiosk.

20. The of claim 4, wherein the fixed location is a restaurant table.

* * * * *